United States Patent [19]

Zenner

[11] 4,208,545
[45] Jun. 17, 1980

[54] SECRECY SYSTEM

[75] Inventor: Walter J. Zenner, Des Plaines, Ill.

[73] Assignee: Teletype Corporation, Skokie, Ill.

[21] Appl. No.: 431,798

[22] Filed: May 24, 1954

[51] Int. Cl.² ............................................. H04L 9/00
[52] U.S. Cl. .......................................... 178/22; 35/4
[58] Field of Search .................. 178/22; 179/1.5; 35/4

[56] References Cited

U.S. PATENT DOCUMENTS

| 2,406,023 | 8/1946 | Locke | 178/22 |
| 2,632,057 | 3/1953 | Koening, Jr. | 179/1.5 |

Primary Examiner—Howard A. Birmiel
Attorney, Agent, or Firm—J. C. Albrecht

EXEMPLARY CLAIM

1. In a system of secret telegraph communication, an incoming channel over which miscellaneous matter intelligence signals are periodically received, an outgoing channel susceptible of operating at a higher speed than said incoming channel, a cipher unit interconnecting said channels, said unit comprising a signal storage device, means controlled by said storage device for periodically generating special supervisory signals for compensating for the speed difference between said channels, a fan circuit connected to said storage device, a ciphering maze connected to said fan circuit, means for inserting masking signals during pauses between said periodically received miscellaneous matter intelligence signals, means for inserting said supervisory signals upon transitions from said received miscellaneous intelligence signals to said masking signals and vice versa, and means operable automatically upon encipherment of all said signals for transmitting the enciphered signals over said outgoing channel.

12 Claims, 17 Drawing Figures

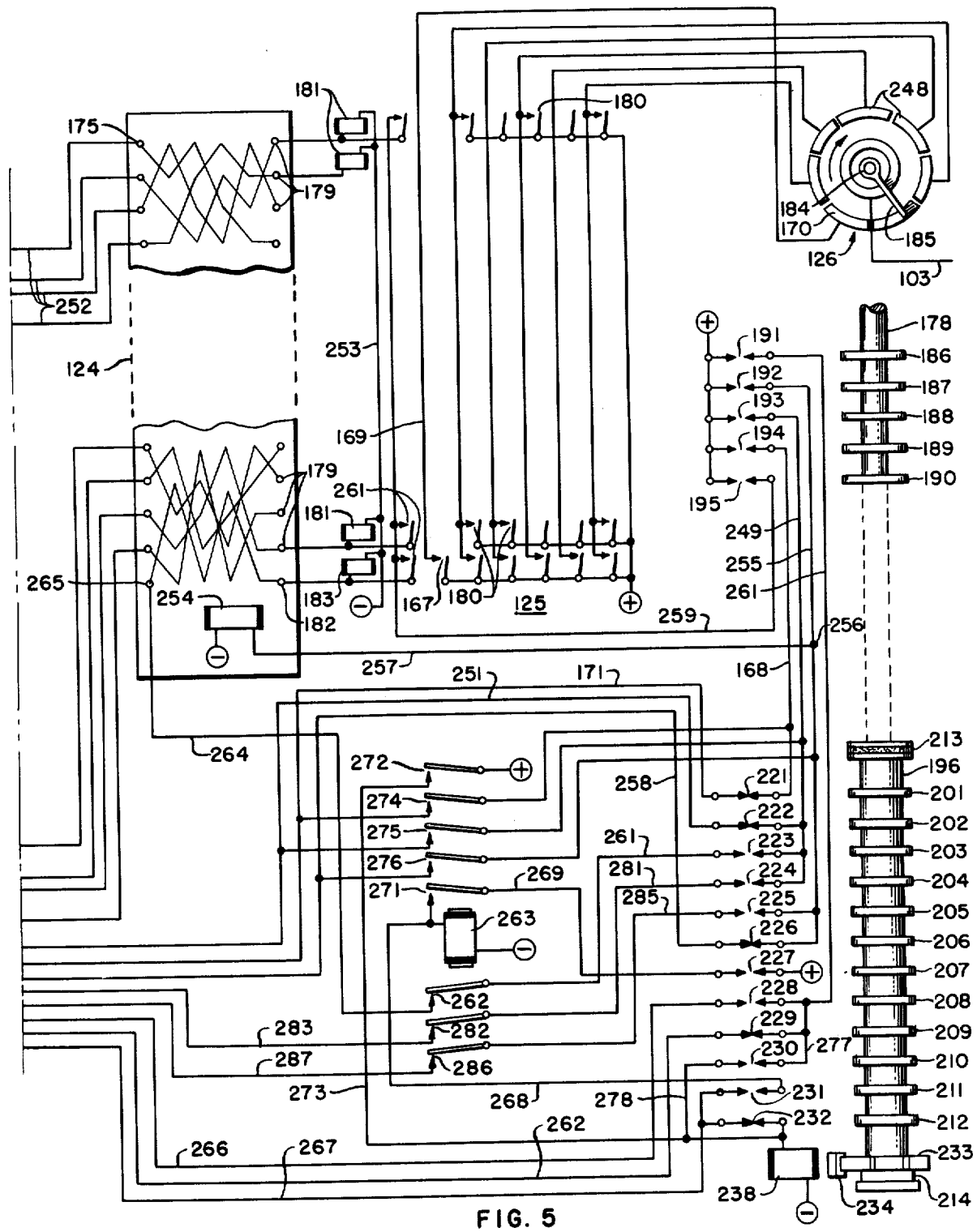
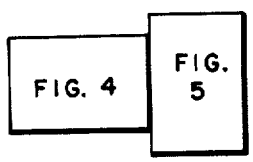
FIG. 6

SECRECY SYSTEM

The present invention relates to automatic telegraph switching systems and particularly to synchronized cipher instrumentalities therefor.

The primary object of the present invention is to insure complete secrecy in the transmission of telegraphic messages.

Another object of the invention is to cover the "key" during the absence of "live" traffic by introducing and enciphering "fill" material, thereby simulating a continuous flow of traffic over the line.

A further object of the invention is to insure the protection of secret messages by completely masking the communication channel to thereby render enciphered messages indistinguishable from the non-message signals or fill.

Briefly, the present invention contemplates the provision, in a trunk circuit of a multi-station communication system, of on-line cipher facilities utilizing synchronous cipher key generators and full masking. Messages which originate at the terminal stations are directed to the message center from which it is desired to transmit over the trunk circuit all traffic without revealing either the quantity of traffic or the beginning and end of the messages comprising said traffic. In this manner, a constant flow of traffic is simulated over the trunk circuit, thus concealing the presence and/or absence of peak traffic loads or activity.

More specifically, the system according to the invention contemplates the provision of cipher key generators at both the transmitting and receiving stations, and to hold these key generators in phase by means of a crystal controlled drive unit or similar instrumentalities. Also, enciphered and/or masking signals are to be sent over the line continuously. In this manner of operation, the time and/or interval between bursts of message traffic is filled with masking signals, so that at no time are there periods when no signals are impressed on the line, and at no time are the "key" signals transmitted alone.

In the system according to the present invention, the beginning and the end of a message are identified by predetermined supervisory signals which are recognized by the receiving terminal and deleted. Moreover, means are also provided whereby the masking signals which fill the gaps between message traffic are also recognized and deleted. Thus, insofar as all the traffic impressed on the line is concerned, the entire traffic on the line is rendered unintelligible to unauthorized persons, because with full masking it is impossible to ascertain where a message begins or where a message ends. In other words, since the keying generators operate continuously and the masking signals fill the gaps in live message traffic there are no idle periods in normal operation.

Moreover, since at the respective stations, the key generators must not run slower than the traffic input rate, said generators are operated at a rate about two percent above that of the incoming signals. To compensate for this, the system according to the present invention provides for the transmission of "speed difference" characters at a rate of about one for every fifty characters transmitted over the circuit. These "speed difference" characters must be recognized at the receiving terminal and deleted. In the key generators according to the present invention provision is made for employing a 33-character "alphabet." Thirty-two of these characters are the usual derivable permutations of the five-unit code. For the thirty-third character a transmission pause of single character duration is used. Since the key generators operate continuously and the masking signals fill the gaps in message traffic, there are no idle periods in normal operation. The absence of signals, therefore, is a condition not normally present. This thirty-third character, therefore, has the appearance of a normal "letters" (all "marking") signal in which the start pulse (normally "spacing") is of "marking" polarity, and will hereinafter be identified as the "Zero" ($\phi$) character. Such an ultra-codal signal along with the other thirty-two characters is capable of being transmitted over existing 5-unit circuits. As defined in the prior art, exemplified by U.S. Pat. No. 2,270,339 issued Jan. 20, 1942 to L. M. Potts, an ultra-codal signal is so called, because it is not one of the thirty-two usable signal combination of a start-stop permutation code. In said Potts patent the ultra-codal (or ultra-code) signal is a prolonged spacing signal differing from a blank signal combination by including no normally marking stop pulse. The ultra-codal signal of said Potts patent comprises a spacing start pulse, five spacing "character" pulses, and a spacing stop pulse. According to the present invention, the ultra-codal signal is a prolonged marking signal which comprises a marking "start" pulse, five marking "character" pulses, and a marking stop pulse.

Of course, various systems may be arranged using this "zero" (or 33rd) character, or ultra-codal signal, as a master control signal. Other characters, for example, may be used with it in a sequential manner in a two or three character group, or this "zero" character may be regarded as an additional shift signal. However, in the system according to the present invention, this "zero" character is used alone or singly as a "speed difference" character. Moreover, to indicate the beginning of a masking transmission this "zero" character is transmitted twice in succession. Since masking transmission originates close to the key generator, it is feasible to synchronize the operation of the masking signal transmitter with that of the key generator so that no speed or time difference characters are inserted during transmission of masking signals. As a result, the transmission of a single "zero" character can also be used to indicate the end of the masking transmission. This has the further advantage, as will be observed hereinafter, that if the receiver inadvertently misses the end of masking signal which controls this resumption of transmission of normal live traffic, the first appearance of a "zero" or speed difference character (one per fifty characters) will automatically restore the receiver to its proper condition.

In addition to the objects above enumerated, other objects and features of the invention will be apparent from the following detailed description when taken in conjunction with the following drawings, wherein:

FIGS. 4 and 5 are schematic diagrams of the electrical circuit at the transmit side of the on-line cipher set according to the present invention;

FIG. 6 is a view showing the relative arrangement of FIGS. 4 and 5;

Figure 1:
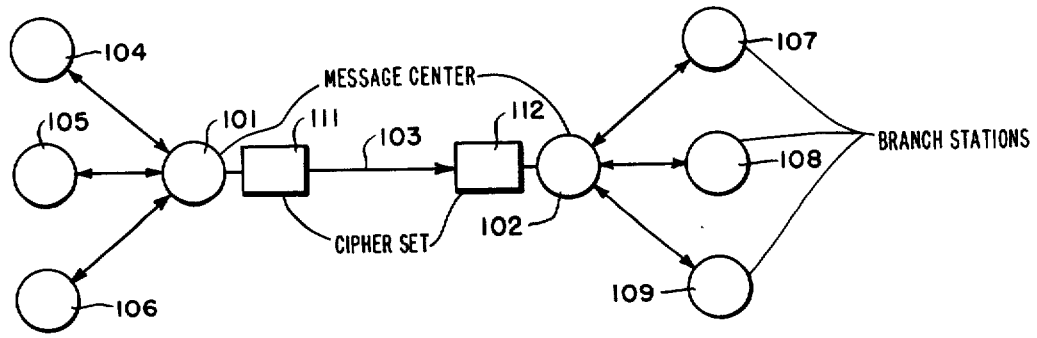
FIG. 1 is a schematic diagram of a telegraph system embodying the arrangement according to the present invention.

Referring to FIG. 1, the central switching stations or message centers 101 and 102 are connected by the trunk line or telegraph channel 103. To the message center 101 are connected the branch or terminal stations 104, 105 and 106 (of which there could be any number). Similarly, to the message center 102 are connected the branch or terminal stations 107, 108 and 109. Associated with the message centers 101 and 102 are the on-line cipher sets 111 and 112, respectively. Each set 111 and 112 comprises a transmitting side and a receiving side, wherein the transmitting side of set 111 is connected over trunk 103, to the receiving side of set 112, and vice versa.

Figure 11:
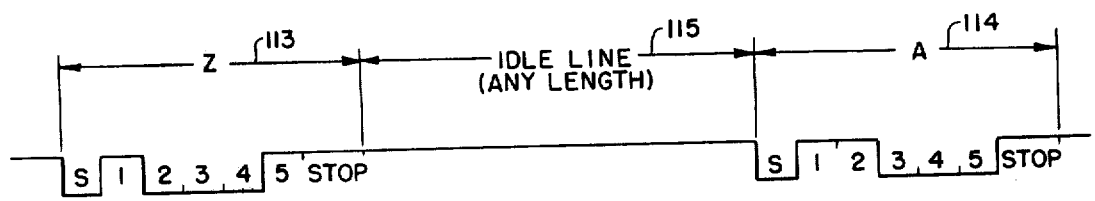
FIG. 11 is a graphical representation of code signals in a conventional start-stop system.

In the well known conventional start-stop method of telegraph operation, the phasing or synchronization is controlled solely by the start and stop impulses, and the idle condition of the line is represented by marking current on the line, which condition may be of any length or duration. For example, as indicated in FIG. 11, the character signals 113 and 114 defining the idle or marking condition of the line are separated by an idle line marking condition 115 of variable length. For purposes of this disclosure, the pause 110 (FIG. 12) of invariable length between transmission of character signals 113 and 114 will be identified as the "zero character" ($\phi$) signal.

Figure 12:
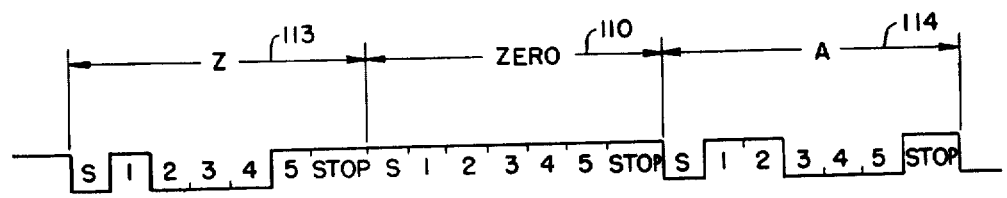
FIG. 12 is a graphical representation of code signals in the continuous or synchronized start-stop system according to the present invention.

In the continuous or synchronized start-stop system according to the present invention, the "zero character"($\phi$) signal 110 is of fixed length and comprises a start impulse of marking current (instead of the usual spacing current pulse), five marking impulses, and the usual stop impulse of marking nature. As indicated in FIG. 12, this zero or 33rd character, therefore, has the appearance of a normal "letters" signal in which the start pulse is of marking nature. The 32 other characters are the usual derivable permutations of the 5-unit Baudot code. Thus, the zero or 33rd character (also identified herein as an ultra-codal signal), along with said other 32 characters is capable of being transmitted over existing 5-unit circuits. The function of this zero or 33rd character as a control signal will appear hereinafter.

Figure 2:
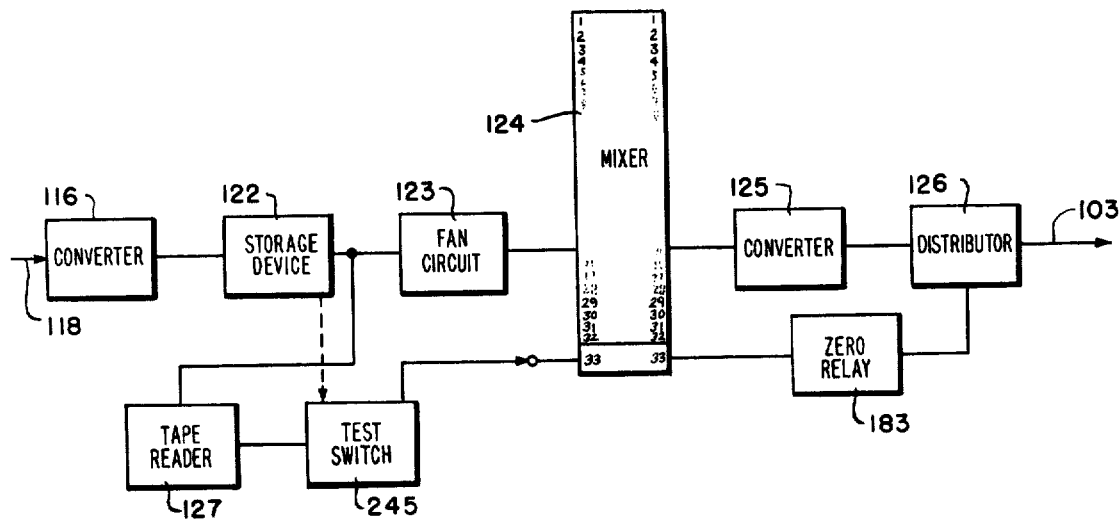
FIGS. 2 and 3 are schematic representations of the transmitting and receiving terminals, respectively, of the basic system forming the subject matter of the present invention.
Figure 3:
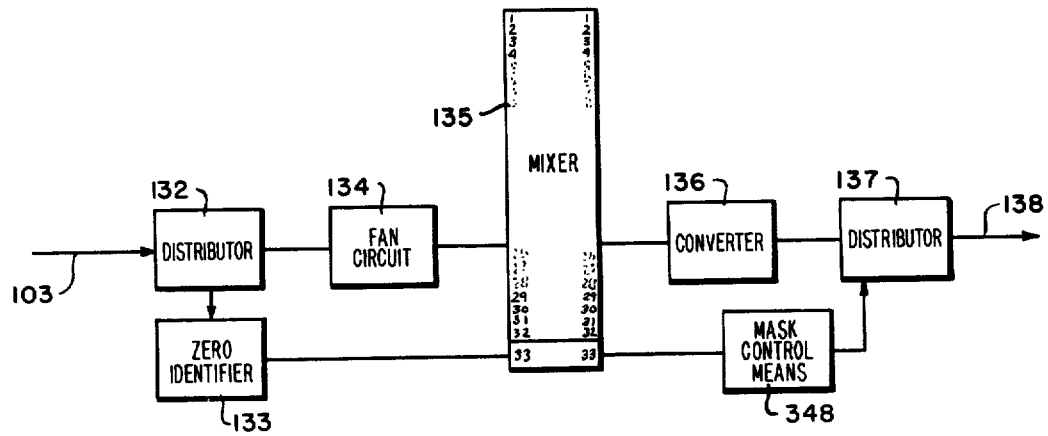

The cipher set 111 or 112 indicated in FIG. 1 comprises the elements schematically illustrated by the rectangles in FIGS. 2 and 3. The transmit side of the cipher set shown in FIG. 2 includes a converter 116 which transposes the signals from a single wire input to a 5-wire output. The converter 116 is exemplified in FIG. 4 by the brush-type distributor 117. Thus, the start-stop signals coming in over the single wire 118 from the message center 119 are distributed to the five receiving magnets 121 of a character storage device 122 of the type disclosed in U.S. Pat. No. 2,358,123, granted Sept. 12, 1944 to W. J. Zenner. The signals are then directed through a relay fan circuit 123, of well known type, to a mixer or ciphering maze 124 of the wired code wheel type arranged for a 33-character alphabet (that is, the usual 32 permutations of a 5-unit code plus the zero ($\phi$) character according to the invention). The ciphering maze or mixer may be of the type shown in U.S. Pat. Nos. 1,861,857 and 1,510,441 issued to E. H. Hebern. From the mixer 124 the ciphered character is converted into its 5-unit permutation code by the electromagnetic or relay type converter 125 from which said ciphered code signals are distributed to the trunk line 103 by the brush-type distributor 126 which generates start-stop signals.

As previously mentioned, the idle time between bursts of traffic are filled with masking signals to protect or cover the "key" and simulate continuous traffic to thwart interception and analysis of traffic flow by unauthorized persons. A 5-wire tape reader 127 (for example, of the type disclosed in Geotz U.S. Pat. No. 2,296,845) may be used for a source of masking signals. As will hereinafter appear, the transmission of masking signals (which are in the nature of random characters or other non-informative or dummy matter) occurs between bursts of traffic, and the introduction of the masking signals on the line is under the control of the test switch 245. The key generator or mixer 124 is operated at a rate about two percent above that of the incoming signals. This results in the transmission of speed differences or zero characters at a rate of about one for every fifty characters transmitted over the circuit. These speed difference or zero characters are recognized at the receiving terminal and deleted, as will hereinafter appear.

All of the signals (masking, traffic and control or supervisory signals) are transmitted over the trunk line 103 by the transmitter distributor 126 as enciphered signals, since they have all passed through the mixer 124. These enciphered signals are received on the receiving side of the remote cipher set by the receiving distributor 132. Associated with the receiving distributor 132 is a zero identifying means 133 which recognizes received "zero" characters, which have resulted from encipherment by maze 124. From the receiving distributor 132 all of the signals, except said "zero" signals, are directed through a fan circuit 134 (similar to 123) to a mixer or ciphering maze 135 (also referred to as a "key" generator) similar to mixer 124, where the signals are deciphered and directed through a code converter 136 to a transmitting distributor 137 from whence the signals are transmitted over the line 138; for example, to the message center 102.

Figure 16:
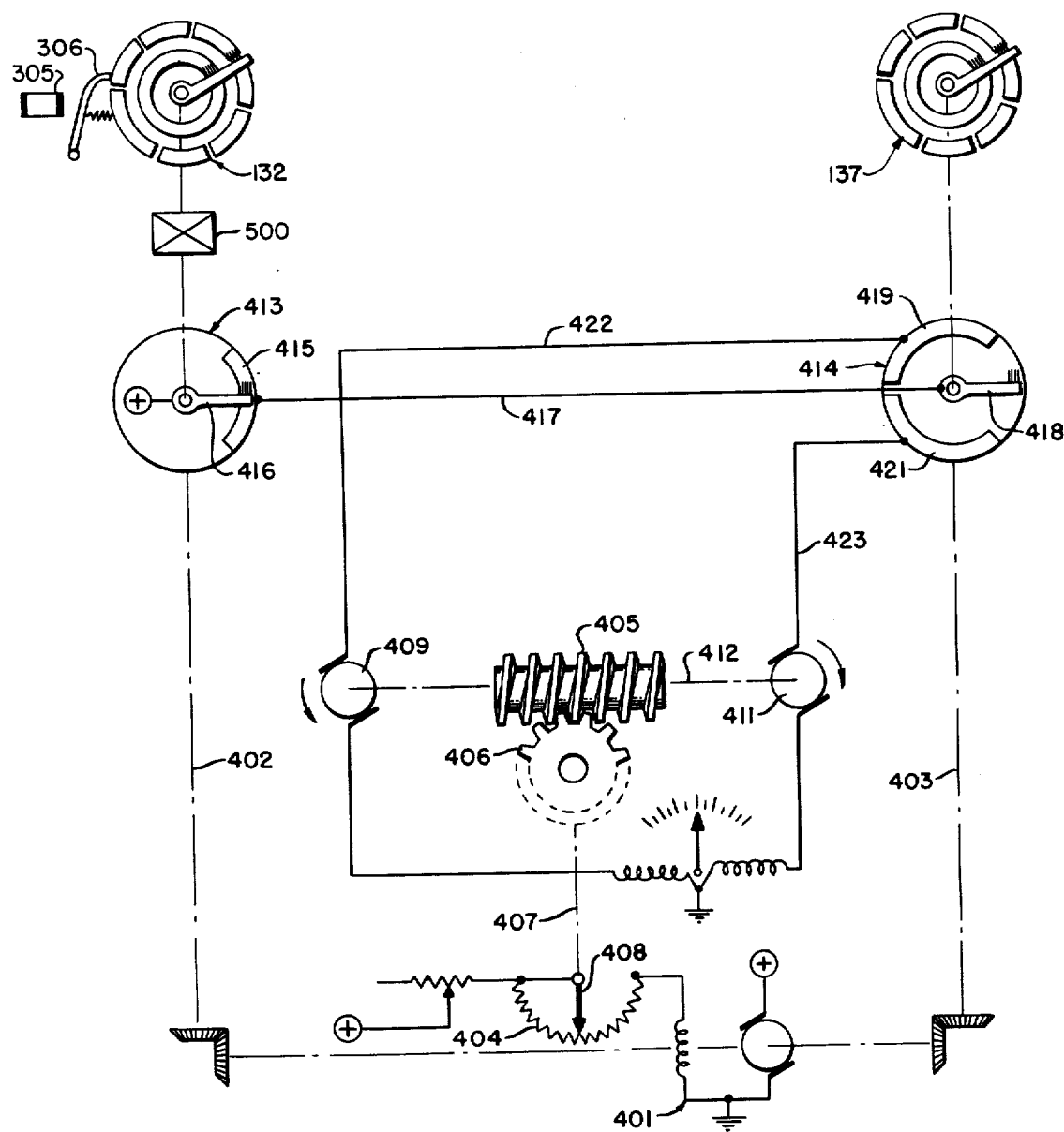
FIG. 16 is a schematic diagram of the corrector circuit on the receive side of the cipher unit.

The phasing of the various units in FIGS. 2 and 3 may be effectuated under the control of a crystal controlled drive unit or other suitable control means. For example, the stepping or phase of the units in FIG. 2 may be controlled by a crystal controlled drive unit of the type disclosed in U.S. Pat. No. 2,595,656 granted May 6, 1952 to T. A. Hansen, the output pulses of which may be utilized to control the tripping of the clutch in the output distributor 126 (FIG. 5). In the event crystal controlled oscillators are employed for synchronization, then the oscillator at the receiving station may be provided with a corrector feature such as described in U.S. Pat. No. 2,609,451 dated Sept. 2, 1952, issued to T. A. Hansen. If the well known conventional start-stop method of synchronization is employed, wherein the phasing is controlled solely by the start and stop impulses, a corrector circuit such as shown in FIG. 16 may be used, as will hereinafter appear.

The unit 348 is a mask control means which prevents the masking signals from being transmitted to the message center 102, and instead, substitutes marking current on the signal line, indicative of no traffic flow, thereby omitting printing and/or punching of the masking signals.

Having reference to FIGS. 4 and 5 a more detailed description of the circuit of the transmit side of the ciphering sets 111 and 112 will be given. The transmitting apparatus 142 at the originating station 119 (for example, message center 101) may be any well known keyboard or transmitter operating at a normal speed of 60 WPM (368.1 OPM). The incoming signals are received by a receiving relay 143, whereby, in response to marking signals (normally, current) the contact 144 will be closed, and in response to spacing signals (no-current) the contact 145 will be closed. Thus, when code signals are being received, the start impulse (of spacing nature) will cause the contact 145 to be closed, thereby completing a circuit for energizing the start magnet 146 of the distributor 117 over a circuit extending from battery, over armature 147, through contact 145 (now closed), and through magnet 146 to negative battery (or ground). Magnet 146 upon energizing will pull up its armature 148 thus releasing the brush arm 149 for rotation in well known manner. It is, of course, understood that brush arm 149 is rotated at a speed commensurate with the speed of code impulsing, so that the brush 151 on arm 149 contacts segments 152 in phase or timed relation with the receipt of signal impulses by the receiving relay 143.

The marking impulses received are distributed to the five magnets 121 of the loop storage unit 122 over a circuit extending from battery, over the armature 147 of relay 143, through contact 144 (closed upon receipt of marking signals), over conductor 153, through ring 154, through brushes 155 and 151, through segment 152, over conductor 156, through the winding of magnet 121 and over common conductor 157 to negative battery. Similar circuits are traceable through the remaining magnets 121, which magnets are analogous to magnets 55 of said patent No. 2,358,123. After the received impulses are distributed to the magnets 121, a pair of brushes 158 carried on arm 149 are adapted to contact simultaneously a pair of contacts 159 to complete an energizing circuit for a release magnet 161 (similar to magnet 81 of said U.S. Pat. No. 2,358,123) extending from positive battery through one of the segments 159, through the pair of brushes 158, through the other segment 159, over conductor 162, and through magnet 161, to negative battery.

As disclosed in said U.S. Pat. No. 2,358,123, the loop storage has a plurality of rotatable bails (exemplified by broken line 163), each one of which carries a set of five signal storage contact controlling levers, each settable in accordance with the signal conditions of the associated receiving magnet 121. After the contact controlling levers of a particular bail 163 is set up according to the received signal code combination, the bail is released from a signal transferring position by energizing the release magnet 161 controlled by the local sixth pulse on the receiving distributor, as previously described. The bail 163 rotates until it encounters a projection on the armature of output magnet 164, where the bails 163 are held in their transmitting position, whereat a set of contacts 165 are closed in accordance with the manner in which the contact controlling levers are set by the magnets 121 in response to the signals received by the line relay 143.

Upon closure of any of the contacts 165, circuits are established to respective relays 166 in the fan circuit 123, over circuits extending from positive battery, through contact 194 (when closed) FIG. 5, over conductor 168, through contact 221 (now closed), over conductor 171 (FIGS. 4 and 5), through closed contacts 165, over respective conductors 172 to junctions 173, over conductors 174, through windings of respective relays 166 to negative battery. As is well known in fan circuits, the five magnets 166 have multiple armatures, each provided with resting and operating contacts, the number of armatures increasing according to the series 1, 2, 4, 8 and 16, and are set singly or in combination. Only one path is completed for any of the thirty-two possible arrangements of the magnets 166, so that only one of the contacts 175 of the ciphering maze or mixer 124 is activated. As will presently appear, the energization of the output magnet 164 of the loop storage device 122 is timed and controlled from a contact cam on the output distributor 126 which sends back a pulse, after reading the output, to release a rotatable bail 163 and permit the next bail to rotate into the reading or transmitting position.

Loop storage (through the instrumentality of the storage device 122) is made necessary by the fact that the output distributor 126 is running two percent faster than input. For example, as previously mentioned, the receiving distributor 117 operates at 368.1 OPM (operations per minute), and the mixer 124 and transmitting distributor 126 operates at 375 OPM. This requires insertion of a speed difference or zero character signal once every 50 characters. During the insertion time the incoming signal continues (from the message center 119) and must be stored. Furthermore, with random keyboard operation, the input may drop behind and additional speed difference or zero character signals inserted. If the pause is greater than character signal length it becomes necessary to insert masking signals to protect the "key". During the insertion time required for transmission of the masking signals, the input may resume and thus it will be necessary to store up the input signals on successive bails 163 until the masking signals are removed and transmission switched back to the incoming line. The three or four characters stored will soon be reduced by the two percent factor output line speed.

In the event of a cessation of signal reception from station 119 (FIG. 4), masking signals are inserted automatically by the masking transmitter 127, which is a tape transmitter of the type shown in said U.S. Pat. No. 2,296,845, with the exception that the transmitting contacts 176 are connected to operate in unison instead of sequentially (as in said U.S. Pat. No. 2,296,845) and are connected over the conductors 174 to the magnets 166 of the fan circuit 123. The energization of the clutch release magnet 284 of the transmitter 127 is controlled by a cam mounted on a shaft 178 (FIG. 5) operably associated with the output transmitter 126, as will presently appear.

The output contacts 179 of the 33-point mixer or ciphering maze 124 are connected to individual relays 181, which convert the character identified by the contact 179 into a permutation code (for example, of the Baudot code type) for transmission over the line 103. It is to be borne in mind, even though only a few contacts 179 and associated relays 181 are shown in FIG. 5, that since a five-unit code is being contemplated in the practice of the present invention, there will be thirty-two of each of these contacts 179 and relays 181, plus the zero character contact 182 according to the invention, and its associated relay 183, making a total of thirty-three. Because of this the relays 181 are so wired as to cause a permutation code signal corresponding to the character exemplified by contact 179 to be transmitted by the distributor 126. It is to be noted, however, that the contacts associated with the zero relay 183 are wired differently than the remaining contacts, in that an additional contact 167 is provided, which is connected over a conductor 169 to the start segment 170 of the output distributor 126. Thus, upon operation of relay 183 after encipherment, all its contacts 180 and 167 are closed so that upon rotation of brush arm 185, an all-marking signal having a marking start pulse in addition to the usual marking stop pulse will be transmitted, whereby a closed line of one character duration is simulated, the effect of which will appear hereinafter in connection with the description of FIGS. 7 and 8.

As shown in FIG. 5, the shaft 178 is operably associated with the shaft 184 of the distributor 126, in such a manner that said shaft 178 makes one complete rotation for each rotation of the brush arm 185 which is secured to the shaft 184. Fixed to the shaft 178 are a plurality of cams 186, 187, 188, 189 and 190 which are thus permanently phased with the distributor 126. Associated with said cams 186–190 and operable thereby are a set of contacts 191, 192, 193, 194 and 195, respectively. Carried on shaft 178 is a cam sleeve 196 on which are fixed a series of cams 201 to 212, inclusive. Rotation is imparted to cam sleeve 196 by shaft 178 through the instrumentality of well known friction clutches 213 and 214. Associated with the cams 201 to 212 and operable thereby are a series of contacts 221 to 232.

Figure 14:
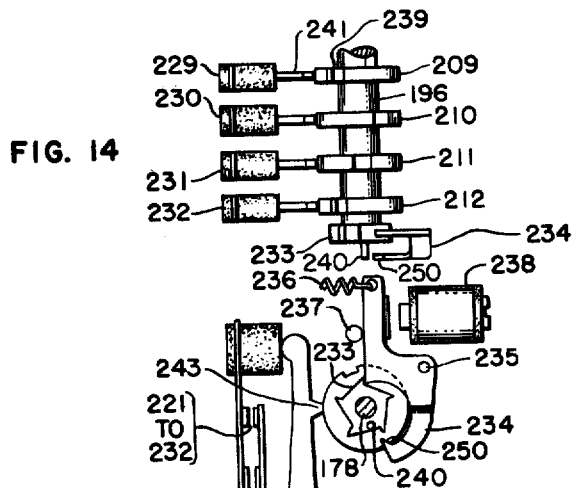
FIG. 14 is a fragmental view showing a portion of a typical sequence switch.
Figure 13:
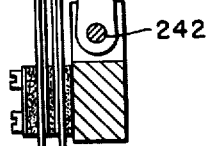
FIG. 13 is a sectional view of a typical sequence switch used in the transmitter and receiver.

Turning to FIGS. 13 and 14, a typical sequence switch will be described. On the sleeve 196 there is also fixed a ratchet 233 adapted to cooperate with a lever 234 pivotally mounted on a pivot 235 and normally spring biased in a counterclockwise direction by a spring 236 against a stop 237. Cooperating with the lever 234 is an electromagnet 238, which in response to an energizing impulse, as will presently appear, will rotate lever 234 clockwise to permit ratchet 233 to escape one tooth distance during each impulse period. Upon prolonged energization of magnet 238, ratchet 233 will rotate to homing position under control of stud 240 on ratchet 233 and tooth 250 of lever 234. The cams 201 to 212 on sleeve 196 are each provided with one or more notches 239. A plurality of contact levers 241 mounted pivotally on a shaft 242 each have a cam follower 243 for cooperating with the cams 201 to 212. A plurality of movable spring contacts 221 to 232 urge the levers 241 towards corresponding cams 201 to 212. When the cams 201 to 212 advance to the position where the notches 239 are opposite the followers 243 the spring contacts 221 to 232, respectively, are permitted to close.

Figure 4:
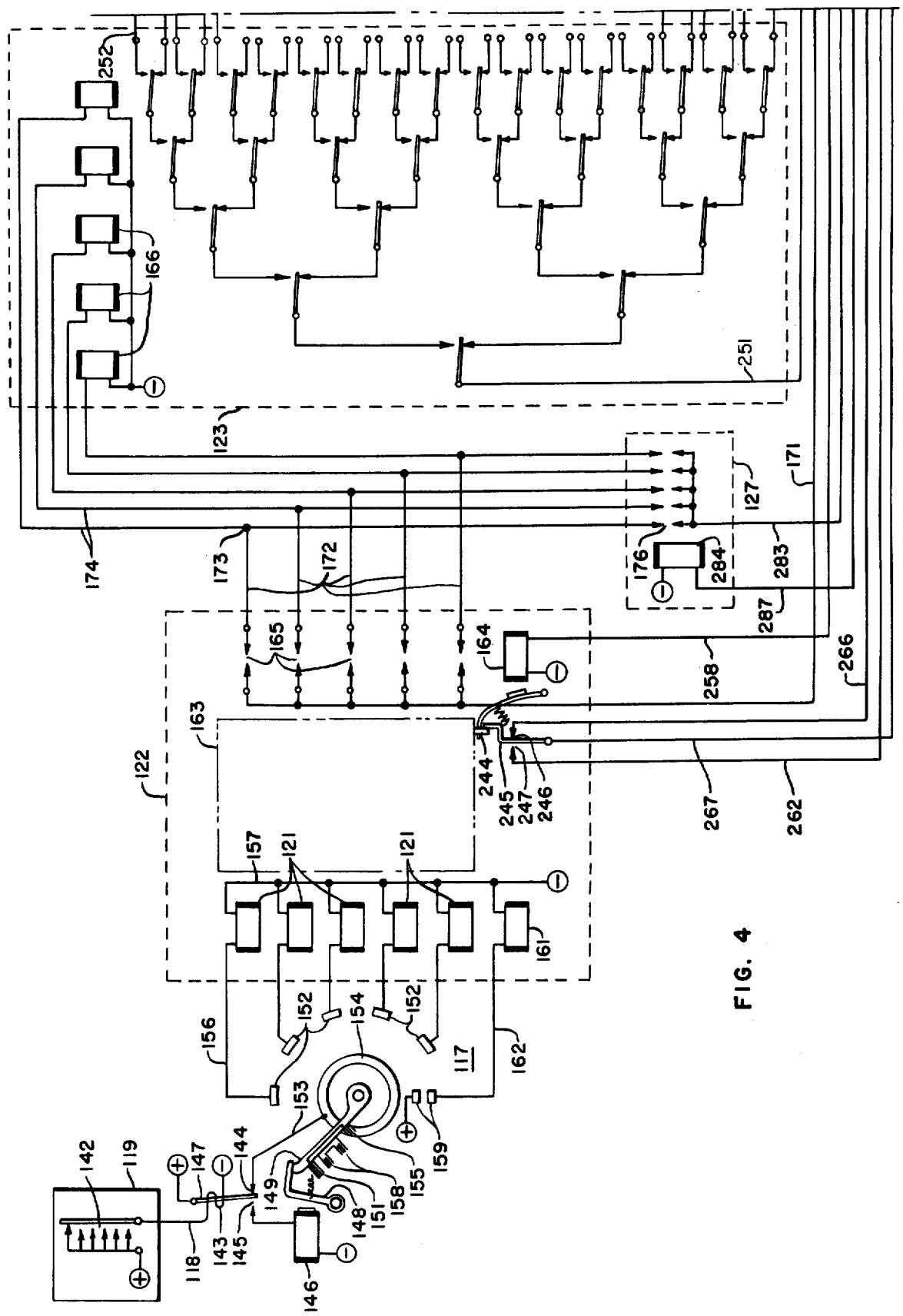

Having reference to FIGS. 4 and 5, each of the loops 163 is provided with a cam projection 244 for controlling the operation of a contact controlling arm 245 which functions to control the insertion of a speed difference or zero character signal when the output overtakes the input, as will presently appear. As long as there is a character stored up and awaiting transmission, contact 246 is closed thus indicating what will be termed herein as a positive loop condition, or that condition of the character storage device 122 wherein one or more loops 163 are in a position for effecting transmission. Moreover, when all of the stored characters have been transmitted, the contact 246 indicating a positive loop is opened, and the contact 247, indicating a negative loop, is closed. This latter condition; viz. with the contact 247 closed, is the signal or control condition to insert a speed difference or zero character signal and permits, during this pause, the incoming line to continue to insert a character into storage.

As indicated schematically in the continuous or synchronized start-stop system shown in FIG. 12, the speed difference or zero character signal resembles the usual five-unit start-stop code signal, except that it comprises a start impulse of marking nature (instead of spacing nature), five "intelligence" pulses of marking nature (similar to the normal "LETTERS" code signal) and the usual stop pulse of marking nature. The "zero" ($\phi$) character will also be identified herein as the 33rd character, the 32 other characters being the usual permutations of the 5-unit Baudot code. As seen in FIG. 12, this 33rd character or zero character may be deemed to be a transmission pause of single character duration, as distinguished from the pause of variable length occurring in the conventional start-stop system exemplified in FIG. 11 by the prolonged marking condition on the line, which variable pause may be identified as an "idle line signal." Thus, the speed difference or "zero" character, according to the present invention, is of fixed or invariable length or duration.

In the normal operation of the transmit side of the on-line cipher set 111, excluding momentarily a consideration of the "zero" character, the signals are initiated at the sending station 101 which transmits at 368.1 RPM. The signals are received on the receiving distributor 117 which transfers the signals from one wire to five wires. The signals are fed to the input side of the storage device 122 and either stored momentarily or passed through a 5-wire storage output whose control magnet 164 is being pulsed at 375 RPM from the output transmitter distributor 126. The 5-wire output from the storage device 122 is then fed to the fan circuit 123, whereafter the output is fed to the 33-point mixer or ciphering maze 124. The relays 181 and 183 on the output side of the cipher maze or mixer 124 are wired to the disc segments 248 of the output transmitter distributor 126 in accordance with the appropriate Baudot code signals exemplified by the permutably arranged contacts 180 set up on relays 181 and 183 for transmission over the line. In the event traffic from the originating source is stopped, the input circuit is switched automatically to the masking transmitter 127, which inserts "fill" to mask the "key."

The sequence of operation, thus far described, is a normal one. However, the "zero" character according to the present invention, introduces a new function as a control signal, as follows:

One "zero" character indicates speed difference. Two successive "zero" characters signal the introduction or insertion of masking signals or "fill" from the masking transmitter 127. One "zero" character following "masking" indicates end of masking and the switching of the circuit from the masking transmitter 127 back to the line input for resumption of "live" traffic signals.

In this connection it is important to observe that when the circuit is switched from the line input to the masking transmitter 127, no further speed difference signals (zero characters) are required because the masking transmitter 127 is locked in, as will presently appear, with the output speed of 375 OPM of the transmitter distributor.

The method of inserting the speed difference (zero) characters, masking and unmasking signals will now be described, with an explanation of the programming contacts and timing. Having reference to FIG. 5, the output transmitter distributor 126 is provided with the series of timing contacts 191 to 195 permanently phased with the distributor 126 because their control cams 186 to 190 are fixedly related to the shafts 178 and 184 and make one complete rotation for each complete rotation of the brush arm 185. On the same shaft, as previously described, are frictionally carried the control cams 201 to 212 for controlling the programming contacts 221 to 232, comprising together a 5-step contact-cam assembly. In normal operation, the programming switch, exemplified by the arrangement shown in FIGS. 13 and 14, is at the "home" position with the contacts arranged as shown in FIG. 5.

Figure 10:
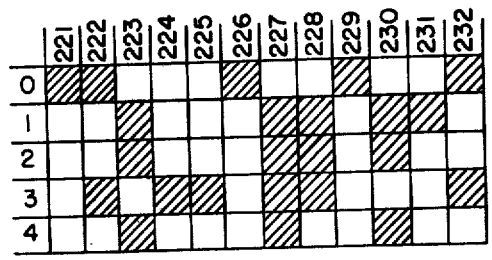
FIG. 10 is a schematic diagram of the program sequence switch, the darkened portions representing periods of closure of the associated contacts.

Referring to FIG. 10, the program switch contacts 221 to 232 are shown diagrammatically; that is the darkened portions represent periods of closure of the contacts. In the diagram, the cams 221 to 232 are represented by the vertical columns, and the step positions of the cam assembly are represented by the horizontal rows. Thus, for example, in normal operation mentioned above, the "home" position is indicated by the "O" row, wherein contacts 221, 222, 226, 229 and 232 are closed.

More specifically, during transmission of a normal signal, the output transmitter distributor 126 is revolving continuously at 375 OPM and the timing contacts 191 to 195 operate as follows: During the rotation of cam 189, the contact 194 closes momentarily (in proper timed relation) to establish a circuit from battery through contact 194 (when closed), over conductor 168, through contact 221 (now closed, FIG. 10), over conductor 171 (FIGS. 4 and 5), through contacts 165 (as permutably operated by the loops 163) over corresponding conductors 172 and 174, through windings of relays 166 to negative battery, whereby a path is selected through the fan circuit in well-known manner. Upon the closure of contact 193 by cam 188 a circuit is established from battery, through contact 193 (when closed), over conductor 249, through contact 222 (now closed), over conductor 251, then through a path of operated contacts in the fan circuit 123 to one of the conductors 252, to a terminal 175 on the mixer or ciphering maze 124, thence through a circuitous path of the maze to an output terminal 179, through the winding of a relay 181 (or 183), over conductor 253 to negative battery. Upon the closure of contact 192 by cam 187 circuits are established simultaneously for magnet 164 of the storage device 122, and magnet 254 of the mixer 124. Firstly, the circuit for magnet 254 extends from battery, through contact 192 (when closed momentarily), over conductor 255 to junction 256, over conductor 257, through the winding of magnet 254 to negative battery. Secondly, the circuit for magnet 164 extends from battery through contact 192 (when closed), over conductor 255, through contact 226 (now closed, FIG. 10, row O), over conductor 258, through magnet 164 to negative battery. Thus, the closure of contact 192 pulses both the storage magnet circuit and the 33-point mixer after the character has been acted upon.

Upon the closure of contact 195 by cam 190, locking circuit for the relays 181 (and 183) is established from positive battery, through contact 195, over conductor 259, through whichever contact 261 (of relays 281, 283) is closed, then through the winding of associated relay 181 (or 183) and over conductor 253 to negative battery. Upon the closure of contact 191 by cam 186, a circuit is prepared for the loop test pulse from positive battery, through contact 191 (when closed), over conductor 261, through contact 229, over conductor 262, through contact 247 (which is open at this time), through contact arm 245, over conductor 267, through contact 232 (now closed) and through the winding of magnet 238 to negative battery. Since normal operation was assumed with characters stored in the character storage device 122, the loop test pulse to the negative loop contact 247 found an open circuit and therefore magnet 238 was not activated.

As thus for described, all operations are normal and straight through the system. However, contact 191 exemplifies an important condition upon which the sytem according to the present invention is based; namely, control of the "zero" character signal. A pulse is sent during each rotation of brush arm 185 to test the input circuit to determine if input characters are in storage in the storage device 122. As soon as the input drops behind, due to the speed differential, it is necessary to fill in with a zero character to compensate for the speed difference. When transmission is stopped it is necessary to introduce the two successive "zero" character signals which are indicative of the beginning of "masking," and then bring in the masking transmitter 127 to send "fill in" or masking signals to cover the "key" in the mixer 124. As soon as new characters appear in the storage loop, the loop test pulse from contact 191 (through contact 247) will detect the change, deactivate the masking transmitter 127 (to remove the "fill") and then send the unmask signal (one "zero" character signal, $\phi$) to indicate a return to normal transmission.

The use of the zero character signal as a speed differential signal will now be described: The output side of the storage loop device 122 is operating at 375 OPM, while the input is operating two percent slower at 368.1 OPM. This means that once every fifty characters the output side pauses for one character duration to allow the input side to catch up. A pulse is sent through contact 191 during each operation of the output transmitter 126 to test for a negative loop, exemplified by the closure of contact 247 due to the absence of stored characters in the storage device 122. Once in every fifty operations, the loop test pulse finds the character storage contact 247 closed (indicative of "negative loop" or absence of stored characters), and thus the circuit (previously described) for the energization of the program switch clutch magnet 238 will be established. Upon operation of the program switch magnet 238 the sleeve 196 will be rotated in escapement manner to its first step position, exemplified by row 1 in FIG. 10, whereby the condition of contacts 221 to 232 will be changed, as follows: Contacts 221, 222, 226, 229 and 232 (previously closed) will be opened; Contacts 223, 227, 228, 230 and 231 (previously open), will be closed; and contacts 224 and 225 will remain open.

Thus, with the opening of contact 221 the circuit through the storage loop output contacts 165 is broken. Likewise, with the opening of contact 222 the paths or circuits through the fan circuit 123 are broken. With the opening of contact 226 the circuit for the energization of the storage loop output magnet 164 is broken. With the opening of contact 229 the circuits for the negative loop test pulse is broken. Finally, with the opening of contact 232 the circuit for stepping magnet 238 is broken.

Upon closure of contact 193 by its cam 188 with the program switch sleeve 196 in its first step position (row 1, FIG. 10), a circuit is established from positive battery, through contact 193 (when closed momentarily), over conductor 249, through contact 223 (now closed), over conductor 261, through normally closed contact 262 of reset relay 263, over conductor 264 to terminal 265 representative of the "zero" character input position in the mixer 124 where it will be enciphered and appear on any one of the terminals 179 and its assocated relay 181 (or 183) for transmission through the output transmitter distributor 126.

During the latter part of this cycle of rotation of cams 186 to 190, the contact 191 will be closed by its cam 186 and a circuit for the transmission of a positive loop test pulse is established from positive battery, through contact 191 (when closed), over conductor 261, through contact 228 (now closed), over conductor 266, through contact 246 (now closed), through contact arm 245, over conductor 267, through contact 231 (now closed), over conductor 268, and through the winding of reset relay 263 to negative battery. A locking circuit for relay 263 is established from positive battery, through contact 227 (now closed), over conductor 269, through locking contact 271 (now closed) and through winding of relay 263 to negative battery. In this one-character-pause to insert the speed differential signal (or "zero" character), the input signals continued and there is now a signal in storage thereby closing contact 246 to indicate a positive loop (that is, presence of stored signals).

When the reset relay 263 operated, it effected the return of the program switch (exemplified by sleeve 196) to its "home" or normal position, because relay 263, upon operating, closed its contact 272 to establish an energizing or holding circuit for the program switch magnet 238, said circuit extending from positive battery, through contact 272 (now closed), over conductor 273, through the winding of magnet 238 to negative battery. Magnet 238 thus is held energized to pull up its lever 234 to permit ratchet 233 to return substantially to "home" position with stud 240 against tooth 250, at which point the locking contact 227 is again opened to release relay 263 and open contact 272, so that when magnet 238 is de-energized, lever 234 will again cooperate with the ratchet tooth in the "home" position, exemplified by the "O" row in FIG. 10, again closing contacts 221, 222, 226, 229 and 232. However, during the interval when sleeve 196 is returning to "home" position, the relay 263 closes parallel circuits through its contacts 274, 275 an 276 simulating the circuits normally including contacts 221, 222 and 226, respectively, so that the circuits could function normally and without hesitation while the program switch returned to its "home" position. This is very important in cryptographic transmission because any unusual condition or signal hesitation will be studied by unauthorized persons as a possible clue toward traffic analysis by message count.

Now will be described the operation of masking and unmasking during a traffic pause occurring at the originating source. As previously mentioned, a pulse is sent through contact 191 upon each operation of the output transmitter distributor 126 to test for a negative loop (that is, absence of stored signals in device 122). During the traffic pause the loop test pulse through contact 191 will find the character storage contact 247 closed to a negative loop (indicative of an absence of stored signals) and will then effect the energization of the program switch magnet 238 over a circuit through contact 232, as previously traced. The program switch will be rotated one step to set the contacts 221 to 232 in accordance with row 1, FIG. 10; namely, contacts 223, 227, 228, 230 and 231 will be closed, and contacts 221, 222, 226, 229 and 232 will be opened (contacts 224 and 225 still remain open).

Now, upon closure of contact 193, with the program switch positioned at its first step, a pulse will be sent through program switch contact 223, (now closed) and reset relay contacts 262, as previously described, to the zero character input terminal 265 in the mixer 124 where it will be enciphered and appear on any one of the 33 output relays 181 (or 183) for transmission through the output transmitter distributor 126. During the latter part of the instant cycle the contact 191 closes to test for a position loop through program switch contact 228. Since this is an input transmission pause, there will be no characters stored in the loop storage device 122, and the pulse from contact 191 will find the loop circuit open at contact 246 of the loop test switch 245. However, in a parallel circuit, the pulse through contact 191 will be traced over conductors 261 and 277, through contact 230 (now closed), over conductors 278 and 273 and through winding of magnet 238 to negative battery, thereby energizing magnet 238 causing the program switch to be stepped to its second position, exemplified by row 2 in FIG. 10, in which position the contacts 223, 227, 228, and 230 remain closed as in the first step position (row 1, FIG. 10). In the second step position, then, the contacts 221, 222, 224, 225, 226, 229, 231 and 232 are open.

When the contact 193 again closes, with the program switch positioned in the second step position (row 2, FIG. 10), a pulse is again sent through the program contact 223 and reset relay contact 262 to the zero character input terminal 265 in the mixer 124 where, as before, it will be enciphered and appear in any one of the 33 output relays 181 (or 183) for transmission through output transmitter distributor 126. These are the two successive zero character signals ($\phi\phi$) which set up the "mask" condition. During the latter part of this cycle, contact 191 closes to test for a positive loop through contact 228 (now closed). Since this is an input transmission pause, the pulse will find an open circuit at the loop storage contact switch 246. However, in a parallel circuit, the contact 191 upon closing will cause a pulse to be sent over conductors 261 and 277, through contact 230 (now closed), over conductors 278 and 273, through the winding of magnet 238 to negative battery, thereby energizing magnet 238 and causing the program switch to be stepped to its third position, exemplified by row 3, in FIG. 10, in which position the contacts 222, 224, 225, 227, 228, and 232 will be closed; and contacts 221, 223, 226, 229, 230 and 231 will be open and the circuits therethrough are inactive.

As the circuits are thus set up on the contacts 221 to 232 it is observed that since contacts 221 and 223 are open the circuits therethrough are ineffective. That is, the circuit through contacts 221 and outputs contacts 165 is broken. However, the contact 222 is closed in this position of the program switch 196 to prepare the circuit for the fan circuit paths when the contact 193 is cyclically closed during the operation of the masking transmitter 127. Also, the circuit through contact 223 and mixer input terminal 265 for the zero character is open. Since this is an input transmission pause, the contact 226 is open, thus rendering magnet 164 ineffective. Contacts 229 and 231 are open, thus rendering relay 263 ineffective (since its locking circuit is broken at contact 271, as previously described). Contact 230 is also open, so that there is no longer a path for the pulse through contact 191 to energize the program switch magnet 238. Thus, the program switch will remain inoperative and remains in the third position (exemplified by row 3, FIG. 10) until the input traffic resumes.

With contact 224 closed, the masking signals are transmitted through transmitting contacts 176 of the masking transmitter 127 (FIG. 4) over a circuit extending from battery, through contact 193 (cyclically closed to initiate a pulse in timed relation with the rotation of brush arm 185), over conductor 249, through contact 224 (now closed), over conductor 281, through contact 282 (now closed), over conductor 283, through tape controlled contacts 176 (which are closed in unison or simultaneously), then over conductors 174 to relays 166 of the fan circuit 123. With contacts 225 closed in the third step (row 3, FIG. 10) position, the clutch magnet 284 of the masking transmitter 127 is pulsed cyclically over a circuit extending from battery, through contact 192 (when closed cyclically), over conductor 255, through contact 225 (now closed), over conductor 285, through contact 286 (now closed), over conductor 287 and through clutch magnet 284 to negative battery.

Therefore, so long as the input transmission pause persists, the masking transmitter 127 will send out masking signals under the control of magnet 284 by the output transmitter 126 which controls the pulsing cams 186 to 190 (of which cam 187 controls the pulsing contact 192 for governing the masking transmitter clutch magnet 284). In other words, the masking transmitter 127 is thus connected into the output circuit to furnish the "fill" to cover the "key"; that is, to insure a continuous flow of signals without indicating the change from live traffic to "fill" material, and vice versa, to the interceptor or unauthorized person. During the latter part of this cycle, contact 191 is cyclically closed to test for a positive loop through contact 228 (now closed). However, since this is a transmission pause, the pulse through contact 191 will find an open circuit again at the loop storage switch contact 246. Moreover, since there is no longer a path for the pulse from contact 191 to the program switch clutch magnet 238, the program switch will remain inoperative and remains in the third position (row 3, FIG. 10) until there is a resumption of input traffic.

Assuming now that the input traffic is resumed, and character signals are again available in the storage loops 163, the next pulse through contact 191 to test for a positive loop through contact 228 will find the character storage contact 246 closed (indicative of a positive loop) to establish a circuit (previously described) for the operation of program switch clutch magnet 238 through contact 232. The program switch will thus be rotated to its fourth step (exemplified by row 4 in FIG. 10, and cause the contacts 221 to 232 to be operated as follows: Contacts 223, 227 and 230 are closed; and contacts 221, 222, 224, 225, 226, 228, 229, 231 and 232 are open.

Thus, with the opening of contacts 224 and 225 the masking transmitter 127 is rendered ineffective to transmit masking signals, or "fill," over the output circuit. The contact 228 is opened to break the positive loop test circuit. Thus, with both of the contacts 228 and 229 open at this time, neither the positive nor the negative loop test circuits are effective, because at this time it is necessary to transmit a zero character to indicate the end of masking. So, when contact 193 again closed cyclically, a pulse is sent through contacts 223 (now closed), over the previously described circuit through contact 262 of reset relay 263 (now de-energized) to the zero character terminal 265 of the mixer 124, where it is enciphered and transmitted in enciphered form from output transmitter 126. This zero character (following "masking") is (as previously described) indicative of "unmask" and signals the return of the circuits to normal operation, as will presently appear.

Since contacts 228, 229 are open at this time, it is manifest that the program switch clutch magnet 238 cannot be energized by the loop test pulses. Therefore, the contact 230 is closed at this time to render the magnet 238 responsive at the proper time to the pulse through contact 191, which occurs later in the present cycle, after the transmission of the zero character (indicative of "unmask") has been determined, thereby causing the program switch to be stepped to the "home" position (indicated by row "0", FIG. 10), whereat the contacts 221 to 232 will be conditioned, as follows: Contact 221, 222, 226, 229 and 232 will be closed; and contacts 223, 224, 225, 227, 228, 230 and 231 will be open. It is observed that contact 223 governing the "zero" character is open, thereby precluding the transmission of the "zero" character to the occurrence of the afore-described prerequisite conditions. Furthermore, the contacts 231 and 227 identified with the operating and locking circuits, respectively, of the reset relay 263 are open at this time. Contacts 224 and 225 are still maintained open, since the masking transmitter distributor 127 is rendered ineffective upon resumption of input transmission. Moreover, since character signals are now available in the storage loops 163, the contact 228 in the positive loop test circuit is open, and the contact 229 in the negative loop test circuit is closed to enable the cyclic testing for a transmission pause. Contact 230 is open at this time in order to place the operation of the program switch magnet 238 under the control of the loop test circuits, previously described.

Since input transmission has been resumed through the character storage device 122, the contacts 221 and 222 are closed, so that the timed impulses through contacts 194 and 193, respectively, can control the circuits through output contacts 165 of the storage device 122, and the circuit paths through the fan circuit 123, as previously set forth. Contact 226 is also closed at this time so that the timed impulse through contact 192 can control the output stepping magnet 164 of the loop storage device 122. It is to be noted that the timed impulse through contact 192 controls either the aforesaid magnet 164, or the magnet 284 of the masking transmitter 127, since the course of the signals (except the "zero" character signal through contact terminal 265 of mixer 124) is through the fan circuit 123.

Figure 7:
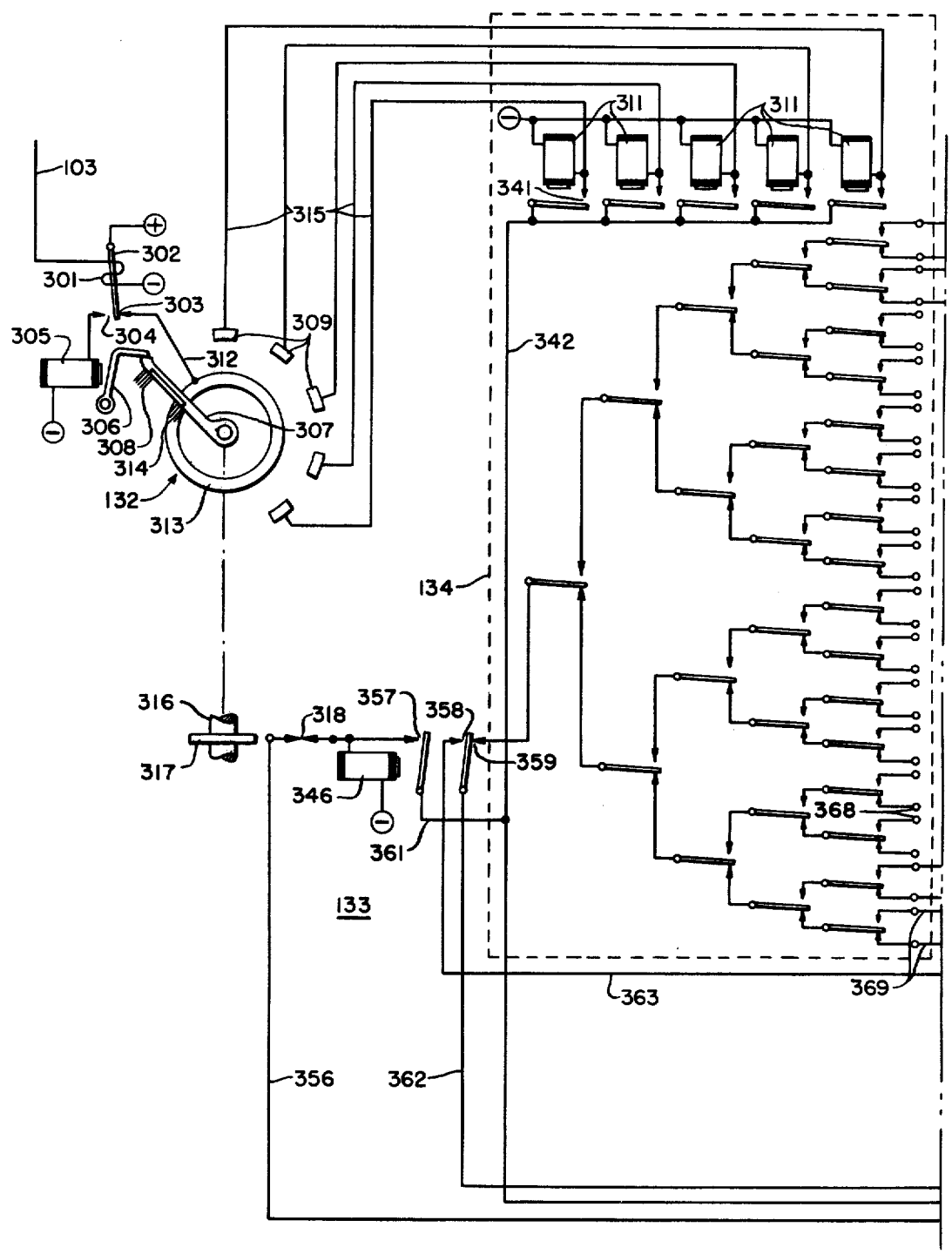
FIGS. 7 and 8 are schematic diagrams of the electrical circuit at the receive side of the on-line cipher set according to the present invention.
Figure 8:
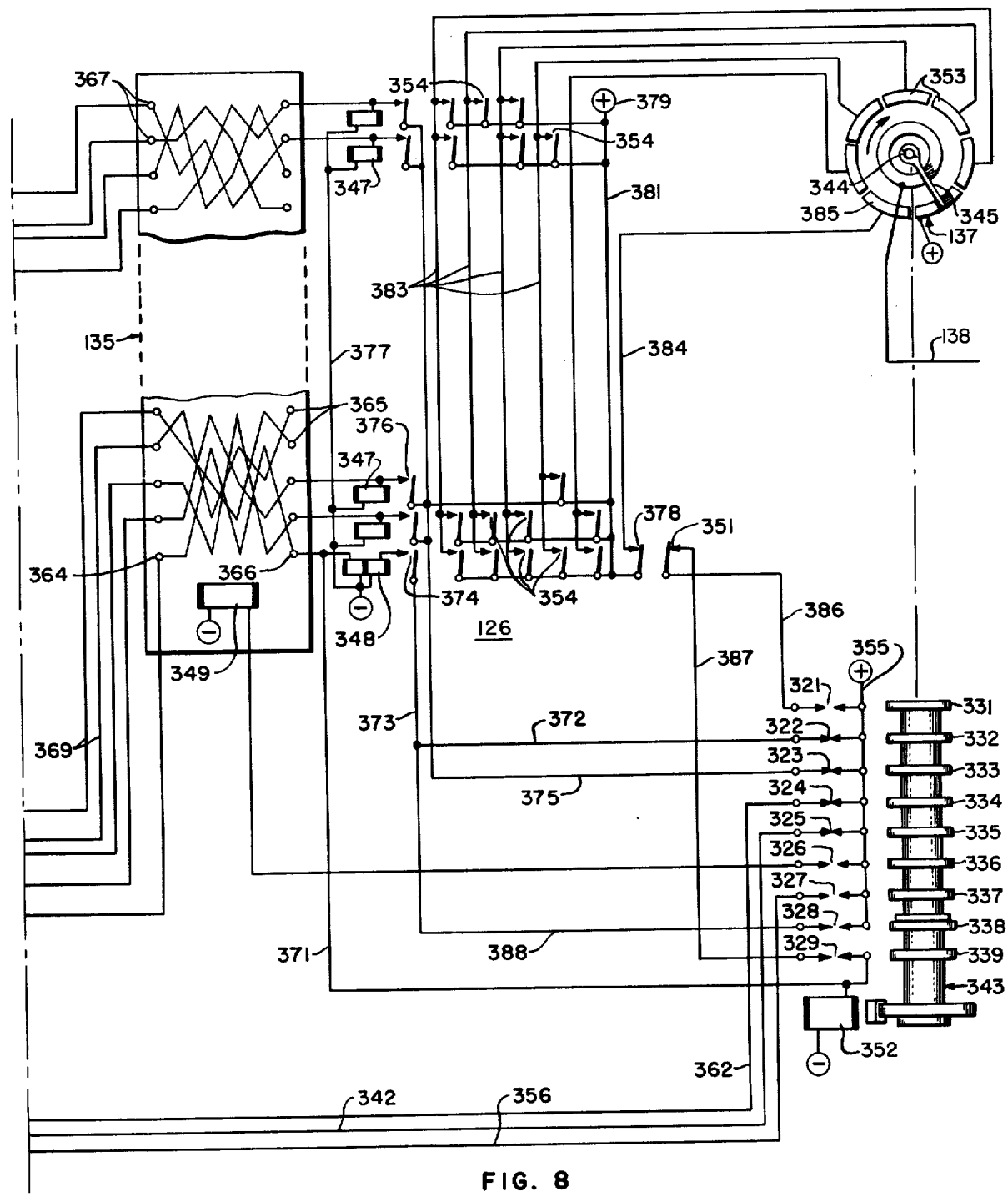
Figure 9:
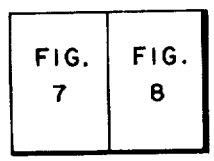
FIG. 9 is a view showing the relative arrangement of FIGS. 7 and 8.

As hereinbefore indicated, all of the signals (masking, live-traffic and control or supervisory signals) are received enciphered on the receiving side of the remotely situated cipher set 112 by the receiving distributor 132 (FIG. 7). At this point distinction should be made between original "zero" signals ($\phi$), which are supervisory signals, and zero signals which resulted from encipherment of other characters at the mixer or maze 124. Said original "zero" supervisory signals may appear at the receiving distributor 132 as other than zero signals or characters, but their supervisory aspect will not be lost because after decipherment they will appear as "zero" signals and will be dealt with as supervisory characters, as will hereinafter be manifest. Referring now to FIGS. 7 and 8, the signals (which are enciphered) are received over the line 103, from the output transmitter 126 (FIG. 5), by a receiving relay 301 (FIG. 7). With normal marking current on the line during a transmission pause, the armature 302 of relay 301 will hold contact 303 closed. On the receive side of the cipher system are distributors 132 and 137. Distributor 132 which receives signals from the incoming line 103 operates on a start-stop basis and is pulsed at the rate of 375 OPM from the input line. Distributor 137, transmitting on the output line 138 to the remote receiving printer or reperforator, rotates continuously at 375 OPM with speed correction from the distributor 132. The speed corrector is shown schematically in FIG. 16 and will be described hereinafter. When code signals are received, the start impulse thereof (of spacing nature) will cause armature 302 to be swung to the spacing side, and thus contact 304 will be closed to complete an energizing circuit for the start magnet 305 of distributor 132 from positive battery, over armature 302, through contact 304 (now closed) and through the winding of magnet 305 to negative battery. Magnet 305 upon energizing will pull up its armature 306, thus releasing the brush arm 307 for rotation. The brush arm 307 is, of course, rotated at a speed commensurate with the speed of code impulsing (375 OPM, in the present instance), so that the brush 308 on arm 307 contacts segments 309 of distributor 132 in phase or timed relation with the receipt of the signal impulses by the receiving relay 301.

The marking impulses received are distributed to the five magnets 311 of the fan circuit 134 over respective circuits extending from positive battery over armature 302, through contact 303 (now closed), over conductor 312, through ring 313, through brushes 314 and 308, through respective segments 309, over respective conductors 315, through the windings of respective magnets 311 to negative battery. The magnets 311 which have become energized are locked up over respective locking circuits extending from negative battery, through the windings of said energized magnets 311, through respective locking contacts 341, over conductor 342 (FIGS. 7 and 8), through contact 325 (now closed), and over conductor 355, to positive battery. Contact 325 is one of a series of timing or control contacts 321 to 327 operated cyclically by a corresponding series of individual cams 331 to 337 secured to the shaft 344 of the transmitting distributor 137. Secured to shaft 316 (FIG. 7) of the distributor 132 is a timing cam 317 adapted to control (in proper timed relation) a contact 318 associated with the input "zero" relay 346, the function of which will hereinafter appear.

Figure 15:
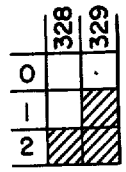
FIG. 15 is a schematic diagram of the sequence switch on the receive side of the cipher unit, the darkened portions representing periods of closure of the associated contacts.

The output transmitter 137 is provided with the series of timing contacts 321 to 327, inclusive, permanently phased with the distributor 137 because their control cams 331 to 337 are fixedly related to the shaft 344 and make one complete rotation for each complete rotation of the brush arm 345. On the same shaft are frictionally carried the control cams 338 and 339 for controlling the programming contacts 328 and 329, comprising together a 3-step contact-cam assembly 343. In normal operation, the programming switch, exemplified by the arrangement shown in FIGS. 13 and 14, is at the "home" position with the contacts arranged as shown in FIG. 15. In FIG. 15 the program switch contacts 328 and 329 are shown diagrammatically, in the manner and described in connection with FIG. 10.

Specifically, during transmission of a normal signal, the arm 345 of the output transmitter distributor 137 (FIG. 8) is revolving continuously, and the timing contacts 321 to 327 operate as follows: During the rotation of cam 335, the contact 325 is closed during a predetermined duration (in proper time relation) to supply locking battery to the five input relay magnets 311 of the fan circuit 134 as previously described; and also to the "zero" relay 346, as will presently appear. Contact 327 in series with contact 318 applies a test pulse to check for a "zero" character at the input receiving distributor 132. Contact 324 applies battery to the input of the 33-point mixer or deciphering unit 135 through the fan circuit 134 and input zero character relay (346) circuit, which impulse travels through the mixer 135 and energizes one of the thirty-three output relays 347–348. Contact 323 supplies locking battery to the output relays 347. Contact 326 controls the pulse to the clutch trip magnet 349 of the mixer 135. Contact 321 controls the circuit through the contact 351 of the output zero character relay 348. Contact 322 supplies locking battery to the output "zero" character relay 348. Contact 328 supplies locking battery to the output "zero" character relay 348 during operation of the program switch 343. Contact 329 controls the energization of the program switch clutch magnet 352.

The relays 347 and 348 on the output side of the maze or mixer 135 are wired to the disc segments 353 of the output transmitter distributor 137 in accordance with the appropriate Baudot code signals, exemplified by the permutably arranged contacts 354, set up on relays 347 and 348 for transmission over the line 310.

The response of the receiving distributor 132 to a "zero" ($\phi$) character resulting from encipherment at the transmitting side (FIGS. 4 and 5), will now be described. It is recalled that the "zero" character is a letters (all marking) signal with a start impulse or interval of marking nature or polarity. Thus, when the "zero" signal is received, the incoming receiving distributor will not be started, but will remain at rest for one character length. However, the output transmitting distributor 137 continues to rotate and provides the timing necessary to decipher the "zero" character. With the distributor 132 at rest when the "zero" character is received, the contact 318 will remain closed. Then the "zero" test pulse through contact 327 (when closed) will energize the "zero" relay 346 over a circuit extending from positive battery, over conductor 355, through contact 327 (when closed), over conductor 356, through contact 318 (now closed) and through the winding of "zero" relay 346 to negative battery. Relay 346 when thus energized closes its contacts 357 and 358, and opens its contact 359. Upon the closure of contact 357, a locking circuit for relay 346 is completed, from negative battery, through the winding of relay 346, through contact 357 (now closed), over conductors 361 and 342, through contact 325 and over conductor 355 to positive battery.

The contact 359 is included in the fan circuit paths controlled and determined by the fan circuit relays 311. Upon the energization of "zero" identifying relay 346 the contact 359 is opened and the contact 358 is closed to thereby complete a circuit to the "zero" input terminal 364 (FIG. 8) extending from positive battery, over conductor 355, through contact 324, over conductor 362, through contact 358 (now closed), over conductor 363 to the input terminal 364 (indicative of the "zero" position) on the mixer 135, then through the maze of mixer 135 to decipher the "zero" character. The deciphered "zero" character may appear on any one of the 33 output terminals 365 and hence any output relay 347 (or 348). If the foregoing decipherment is a normal character (any character other than "zero"), it will appear on any relay 347. If the decipherment of a zero character (or any other character) goes out of the mixer 135 as a "zero" character on terminal 366, then the "zero" output relay 348 on the output side of the mixer will be energized, thereby signifying that special or supervisory conditions had been imposed at the transmitting side (exemplified by FIGS. 4 and 5), which as previously indicated, are as follows:

One "zero" character indicates speed difference.
Two successive "zero" characters indicate:
Mask the following "fill" from the masking transmitter 127. One "zero" character after said masking characters indicates unmask.

It is recalled, in connection with the functioning of the system on the transmit side of the cipher set 112 or 111 (exemplified by FIGS. 4 and 5), that when the circuit on the input side is switched from line input over line 118 to the masking transmitter 127, no further speed difference signals are required or transmitted because the masking transmitter 127 is locked in step with the output transmitter distributor 126. Accordingly, the first "zero" character received after the "mask" signal will "unmask". However, in the event of a temporary open line, the single "zero" character signal, indicative of unmask, serves or functions in another manner, as follows:

It is assumed that in the course of transmission after two successive "zero" character signals have been transmitted with the result that the output is masked, a temporary open line occurs between the transmit side of unit 111 and the receive side of unit 112, and during this break interval the transmit side of unit 111 sent out the unmask signal (one "zero" character signal after the two successive "zero" characters indicating mask had been previously sent) and then resumed traffic. In this instance, the receiving side of unit 112 did not receive the unmask signal (zero) and would continue to mask actual traffic (as distinguished from "fill"). However, as soon as the transmit side has returned to normal traffic, a speed difference zero character signal will be inserted at least once every fifty characters so that after a maximum of fifty characters of mask after the circuit was restored at the transmit side, the receive side would unmask and return to normal.

The sequence of operations during receipt of the "zero" character for speed difference, mask and unmask will now be explained. When a speed difference signal ("zero" signal) is required on the transmit side of the cipher unit, the "zero" character terminal 265 on the input side of mixer 124 is activated. For purposes of illustration, it is assumed that the encipherment of the "zero" character (from terminal 265 of mixer 124) will appear on the character "A" terminal on the output side (one of the output terminals 179). Thus, the "A" relay 181 is energized to pull up its armature to close its contacts 180 arranged according to the permutation code for the character "A." Therefore, the "A" character signal is transmitted from the distributor 126, which when received on the receive side, represented by FIGS. 7 and 8, is applied to the "A" terminal (one of the terminals 367) on the input side of mixer 135. At the output side of the mixer 135, the decipherment will be the "zero" signal, which appears on the output terminal 366 and results in the simultaneous energization of the output "zero" relay 348 and the program switch clutch magnet 352 over the circuit extending from positive battery, over conductor 355, through timing contact 324, over the conductor 362, through contact 359 (now closed), through the fan circuit path under the control of relays 311 to the proper terminal 368 of the fan circuit, over the associated conductor 369 to the associated terminal 367 and through the maze or mixer 135 to the "zero" terminal 366, thence through the winding of "zero" relay 348 to negative battery; and at the same time over conductor 371 through the winding of magnet 352 to negative battery. The output "zero" relay 348 is locked up over a circuit extending from positive battery, over conductor 355, through contact 322, over conductors 372 and 373, through contact 374 (now closed) and through the winding of relay 348 to negative battery. It is observed that relay 348 has a further locking circuit extending over conductor 373 and through contact 328 of the program switch 343 to positive battery and which functions as will presently appear. Incidentally, the locking battery for the relays 347 extends from positive battery, over conductor 355, through contact 323, over conductor 375, through respective contacts 376, through winding of respective relay 347, over conductor 377 to negative battery.

Similar to "zero" relay 183 (FIG. 5), the output "zero" relay 348 upon operation closes its contacts 354, 374 and 378, and opens its contact 351. The contacts 354 control the nature of the code impulses, while contact 378 controls the nature of the start pulse. As previously described, the start pulse of all signals except the "zero" signal is of spacing nature, while in the "zero" signal the start impulse is of marking nature, whereby an all marking signal having a marking start impulse is transmitted. Thus, the output "zero" relay 348 operates to apply marking battery to the start pulse and also to segments 353 on the output transmitter 137 over circuits extending from battery 379 over conductor 381, then simultaneously through contacts 354 and 378 associated with relay 348, over conductors 383 to segments 353, and over conductor 384 to start segment 385 of output transmitter 137, thereby transmitting the "zero" character which appears to the printer as a closed line of one character duration, thereby effecting no printing operation.

When the "zero" relay 348 became energized, the clutch magnet 352 also was energized momentarily over a parallel circuit, which permitted the program switch to rotate to its first step position, whereupon the contacts 329 closed, as indicated in row 1 of FIG. 15. After the transmitter 137 transmitted the 5th impulse of the "zero" code signal, the locking circuit for relay 348 through contact 322 opened. Contact 325 opened and reclosed to break the locking circuit for relay 311 to again permit operation of the fan circuit relays 311 in accordance with the next character received on distributor 132. Contact 323 was again operated to establish a locking circuit for the selectively operated output relay 347. Simultaneously therewith, contact 321 closed and completed a circuit for operating the clutch magnet 352 extending from positive battery, through contact 321, over conductor 386, through contact 351 (now closed), over conductor 387, through contact 329 (now closed) and through the winding of magnet 352 to negative battery. The program switch then stepped to the second position exemplified by row 2 in FIG. 15, and due to the fact that contact 329 is still closed and the circuit for maintaining magnet 352 energized is still closed through contact 321 and 351 for a predetermined period, the program switch 343 will be stepped to its "home" position, exemplified by row 0 in FIG. 15. Upon the stepping of the program switch 343 to its "home" position, the contact 329 was opened to remove battery from magnet 352. Briefly, after a single output character transmission, the program switch 352 is returned to its "home" position during the succeeding character interval and without interference to that character.

The sequence of operation for the "zero-zero, mask, zero" code sequence will now be described. In this sequence, the two successive "zero" character signals indicate "beginning of mask" and initiated operation of the masking transmitter 127 (FIG. 4). "Mask" in this sequence is taken to include all of the ensuing character signals or random and/or non-message (test sentences, for example) transmitted as "fill" from transmitter 127. Finally, the "zero" signal following "mask" is the "end of mask" or "unmask" signal. It is assumed that on the transmit side of the cipher unit (exemplified by FIGS. 4 and 5) the "zero-zero, mask, zero" code signals were enciphered; and appear as code signals A, B, C and D at the receive side, exemplified by FIGS. 7 and 8. In this ABCD sequence, C is taken merely as symbolic of the group of "fill" or "mask" signals, said signals in the "fill" being variable both as to number and identity; that is, the sequence ABCD may be indicated as A.B.(C-RS—OMZ).D. When said A-code signal (which resulted from the encipherment of the first "zero" signal) is received on the distributor 132 it sets up a path through the fan circuit 134 and mixer 135, and in the resulting diciperment the path thereof including contact 324 would lead to the "zero" output terminal 366 of mixer 135 and energizes the "zero" output relay 348, which becomes locked up through contact 322. The zero relay 348 upon operating causes its contacts 354 and 378 to close whereby marking current is applied to segments 353 and 385 of the output transmitting distributor 137, thereby transmitting the "zero" (φ) character. The receiving printer, for example, connected to line 138 will sense or detect a closed line (marking) and pause even though the transmitter distributor 137 continues to rotate at its fixed speed of 375 OPM—corrected to the transmit output distributor speed of 375 OPM. When the output "zero" relay 348 was thus energized, the program switch clutch magnet 343 was energized in parallel, whereby the program switch 343 is rotated to its first step position and set the switches 328 and 329 as indicated in row 1 of FIG. 15.

After the transmitter 137 transmitted the 5th impulse of the first "zero" code signal (of the aforementioned sequence), the locking circuit for the output "zero" relay 348 was opened at contact 322 which thereafter closed. When the B-code signal (which resulted from the encipherment of the second "zero" signal) is received on the distributor 132 a path is set up through the fan circuit 134 and mixer 135 as before described, and in the resulting decipherment the path thereof including contact 324 leads to the "zero" output terminal 366 of mixer 135 and energizes the "zero" output relay 348, which becomes locked up through contact 322. Again, operation of the "zero" relay 348 applies marking battery to all segments 353-385 of the transmitter 137 which thereby transmits the second "zero" character. As before described, when the "zero" relay 348 was energized, the program switch clutch magnet 352 was energized in parallel, and the program switch 343 rotated to its second step, exemplified by row 2, FIG. 15. With contact 328 of the program switch 343 closed, the output "zero" relay remains locked up (after the normal locking circuit thereof opens at 322) over a new locking circuit extending over conductor 388 and through contact 328 to positive battery.

In this condition of operation with the "zero" relay 348 locked up through contact 328, the contacts 354 and 378 are held closed, so regardless of which of the other output relays 347 is thereafter operated, marking battery will be applied through contacts 354 and 378 to all of the segments 353 and 385 of the distributor 137, which will continue to transmit "zero" characters as long as contact 328 remains closed. As was mentioned hereinbefore, the masking signals which fill the gaps between bursts of message traffic are recognized and deleted. This, then, is the manner in which the masking signals or "fill" is deleted by converting said "fill" into "zero" characters, thus simulating a continuous marking condition on the line, and accordingly, the receiving unit on line 138 will not print, or perforate tape. Aside from the saving of paper and tape, and wear and tear on the equipment, the foregoing feature is very important in that the special signals (control or supervisory signals) will not appear on the output tape or record, and the character count will not be affected. Furthermore, with the aforedescribed arrangement, any previously enciphered message tape can be fed into this system, and the output tape will be identical in count, and will be repeated character for character.

The contacts 328 and 329 will remain closed as long as the program switch 343 remains in the second step position just described. As previously assumed, the next character of the sequence is the letter "C" which is assumed to be the first character of the group of masking signals or "fill," and is taken to be symbolic of said group. Upon closure of contact 324, the path for said letter "C" is established through the fan circuit 134 and mixer 135, and assuming the decipherment path leads to the X terminal 365 on the output side of the 33-point mixer 135, the X relay 347 is energized and locked up through the contact 323. However, the output "zero" relay 348 is still locked up through contact 328, and the X relay contacts are covered or masked by the "zero" contacts 354. Since there is no circuit path to the program switch clutch magnet 352, the program switch 343 remained on the second step position and the contact 328 and 329 remains closed. After the receiving output transmitter distributor 37 transmitted the 5th pulse of the "zero" code signal, the X output relay locking battery through contact 323 opened.

Contact 324 again closes in the ensuing cycle to establish a circuit for the next character through the fan circuit 134 and mixer 135. As previously assumed, this next character is the character "D" of the aforementioned sequence, the function of which is to signify "end of masking" (unmask). As is manifest, the decipherment path of the character "D" will lead to the "zero" relay 348 on the output side of the 33-point mixer 135. However, the "zero" relay 348 is still held energized by the locking circuit previously established through contact 328, and accordingly, the pulse from contact 324 through said decipherment path has no effect on the "zero" relay 348 at this time. But, said impulse from contact 324 will travel along the parallel circuit exemplified by conductor 371 to energize the program switch magnet 352, which will cause the program switch 343 to rotate to its "home" position, and change the condition of contacts 328 and 329 as shown in row O in FIG. 15. In the meantime, however, before the contact 328 was opened, the continued operation of the output "zero" relay 348 (locked through 322) applied marking battery to all segments 353 and 385 of distributor 137 resulting in the transmission of a "zero" code signal (all marking, including marking start interval). With the program switch 343 thus returned to its "home" position, the receive side of the cipher unit (112 or 113) returns to normal operating conditions and traffic will resume.

Having reference to FIG. 16, a description of the speed corrector circuit used on the receive side of the cipher unit to keep the output transmitter distributor 137 in phase with the output transmitter distributor 126 on the transmit side will now be given. In the corrector system shown, a shunt motor 401 is employed and drives shafts 402 and 403 through suitable connections. Brush arms 416 and 418 may be driven by their respective shafts 402 and 403 through the instrumentality of friction clutches (not shown) in well known manner. Shaft 402 is rotating the receiving distributor 132 at 420 RPM, and the shaft 403 is rotating the output transmitter distributor 137 at 375 RPM. The speed of the motor 401 is controlled by varying the field resistance 404. The field resistance 404 is varied through a mechanical worm and gear arrangement comprising a worm 405 and a gear 406. Connected to the shaft 407 of gear 406 fixed thereto is an index pointer 408. Said worm and gear arrangement functions to increase or reduce the resistance 404 to slow-up or speed-up the motor 401. The worm gear 405 is controlled by two motors 409 and 411, one at each end of the worm shaft 412. The motor 409, for example, is energized to turn the worm 405 counterclockwise to reduce the field resistance 404 and speed up the motor 401, while the motor 411 is energized to turn the worm 405 clockwise to increase the field resistance 404 to reduce the motor speed.

Control is derived from the disc and brush assemblies 413 and 414 mounted on shafts 402 and 403, respectively. On the assembly 413, battery is applied to a small segment 415 through a brush 416. The segment 415 is connected by a conductor 417 to the brush 418 of the assembly 414. The assembly 414 is provided with a pair of segments 419 and 421, which are arranged complementally with respect to segment 415. When the brush assembly 414 is out of phase counterclockwise with respect to brush assembly 413, the brush 418 contacts the segment 419 whereupon a circuit is completed from battery, through brush 416, through segment 415, over conductor 417, through brush 418, through segment 419, over conductor 422 and through the winding of motor 409 to ground. Motor 409 thereupon rotates the worm 405 in such a manner as to reduce the resistance 404 to speed up the motor 401. When the brush assembly 414 is out of phase clockwise, brush arm 418 contacts the segment 421 to complete a circuit from battery, through brush 416, through segment 415, over conductor 417, through brush 418, through segment 421, over conductor 423 and through the winding of motor 411 to ground. Motor 411 thus rotates the worm 405 in such a manner as to increase the resistance 404 to slow down the motor 40. When the two shafts 402 and 403 are in phase, the aforedescribed energizing circuits for motors 409 and 411 will be open and no correction is required.

A modification of the circuit arrangement shown in FIG. 7 is disclosed in FIG. 17, wherein it is contemplated to operate the receiving distributor 132 continuously, instead of on a start-stop basis as was described in connection with FIG. 7. The elements in FIG. 17 which have their counterpart in FIG. 7 have been given the same numeric. Having reference to FIG. 17, the signals are received over the line 103, from the output transmitter 126 (FIG. 5), by the receiving relay 301. With normal marking current on the line during a transmission pause, the armature 302 of relay 301 will hold contact 303 closed. On the receive side of the cipher system the distributor 132 which receives signals from the incoming line 103 operates continuously (instead of on a start-stop basis, as previously described) at the rate of 375 OPM.

When code signals are received, the start impulse thereof (of spacing nature) will cause contact 303 to open, and to cause contact 304 to close to complete an obvious energizing circuit for a magnet 509, as will presently appear. Since it is assumed that the brush arm 307 rotates relative to segments 309 in synchronism with the speed and phase of the received code impulses, the brush 308 will contact the newly added segment 501 during the start impulse interval. However, since contact 303 is now open, no current can flow through the segment 501, nor through relay 502 connected thereto over conductor 503. Therefore, during the reception of normal start-stop signals, the effect thereof upon the fan circuit 124 will be the same as hereinbefore described.

The response of the modified receiving distributor 132 to a "zero" (φ) character will now be described. It is recalled that the "zero" character is a letters (all marking) signal with a start impulse or interval of marking nature or polarity. However, in accordance with the modification being described, when the "zero" signal is received, the marking start impulse wll be impressed on segment 501 to energize the relay 502 over a circuit extending from positive battery, over armature 302, through contact 303 (now closed), through ring 313 and brush arm 307, segment 501, over conductor 503, and through the winding of relay 502 to negative battery. Relay 502 upon energizing, will close its contacts 504 and 505. Upon closure of its locking contact 504, relay 502 will become locked up over the same circuit exemplified by conductor 342, as locks up relays 311 of the fan circuit 124. Now, the "zero" test pulse through contact 327 (FIG. 8), when closed, will energize the "zero" relay 346 over a circuit previously described extending over conductor 356, then through contact 505 (now closed), over conductor 506, and through the relay 346 to negative battery. In the modified form of the invention shown in FIG. 17, it will be observed that the contact 505 is analogous to contact 318 in FIG. 7, and is operated by a relay 502 instead of by a cam (such as cam 317). The contacts 357, 358 and 359 of relay 346 function in the same manner and for the same purpose as previously described in response to the "zero" signal.

Figure 17:
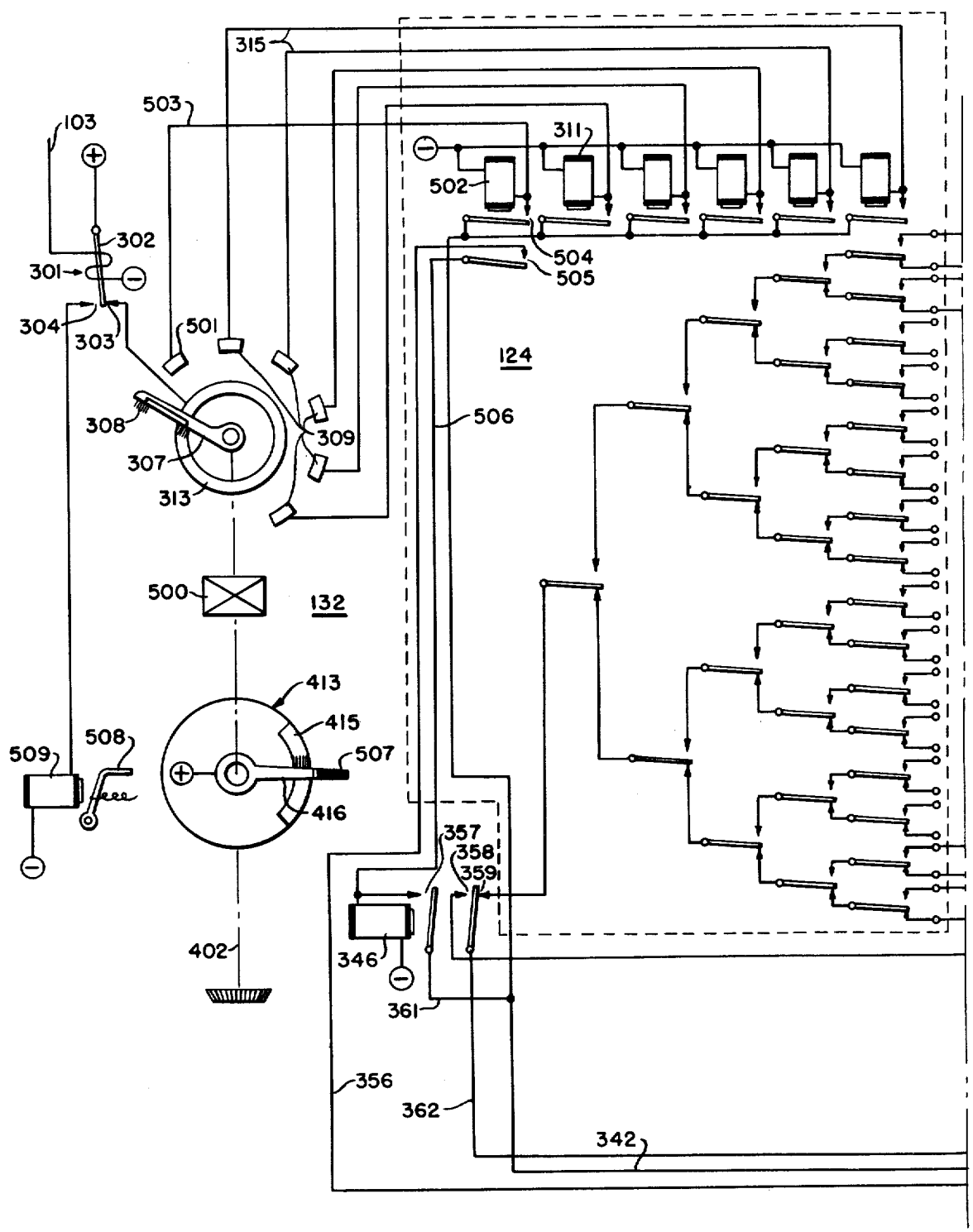
FIG. 17 is a modification of the circuit arrangement shown in FIG. 7.

Also shown in FIG. 17, is a portion of the speed corrector circuit, such as shown in FIG. 16, which is modified in accordance with the modification (FIG. 17) of the receiving portion, originally disclosed in FIG. 7. As indicated in FIG. 17, the brush arm 416 of the disc and brush assembly 413 is provided with an extension 507 adapted to cooperate with an armature 508 of a relay 509. As previously mentioned, in response to the start impulse of no current or spacing nature, the contact 304 closes to establish a circuit for energizing the magnet 509 (analogous to magnet 305), which is now associated with arm 416 of the speed corrector circuit, since the distributor 132 is now rotating continuously. Suitable speed reduction means 500 is provided in view of the fact that arm 307 rotates continuously at 375 RPM, and arm 416 rotates start-stop at 420 RPM.

By the present invention there is provided a ciphering system which is designed to handle enciphered transmission in such a manner that all message traffic signals are rendered indistinguishable from idle time signals between said messages thereby providing full masking of the signal channel. It is contemplated that the settings of the code wheels in the mixer units or ciphering maze at the different stations will be uniform and will be accomplished by any of the methods well known at the present time. Various changes and modifications may be made without departing from the spirit and scope of the invention.

What is claimed is:

1. In a system of secret telegraph communication, an incoming channel over which miscellaneous matter intelligence signals are periodically received, an outgoing channel susceptible of operating at a higher speed than said incoming channel, a cipher unit interconnecting said channels, said unit comprising a signal storage device, means controlled by said storage device for periodically generating special supervisory signals for compensating for the speed difference between said channels, a fan circuit connected to said storage device, a ciphering maze connected to said fan circuit, means for inserting masking signals during pauses between said periodically received miscellaneous matter intelligence signals, means for inserting said supervisory signals upon transitions from said received miscellaneous intelligence signals to said masking signals and vice versa, and means operable automatically upon encipherment of all said signals for transmitting the enciphered signals over said outgoing channel.

2. In a secret start-stop telegraph communication system, a signal line, a sending station having a first source of signals and a second source of signals, said signals having normal spacing start intervals means for impressng on said signal line at intermittant intervals signals from said first source, and means for impressing on said signal line signals from said second source at all intervals when no signals from said first source are impressed on said signal line, whereby a continuous stream of signals is impressed on said line, means for introducing ultra-codal supervisory signals having marking start intervals indicative of the transitions of signaling from said sources of signals, means for enciphering all of said signals prior to transmission from said sending station, and a receiving station including means for recognizing and deleting said ultra-codal supervisory signals and the signals from said second source.

3. In a secret start-stop telegraph communication system, a signal line, a sending station having a first source of signals and a second source of signals, said signals having normal spacing start intervals means for impressng on said signal line at intermittant intervals signals from said first source and means for impressing on said signal line signals from said second source at all intervals when no signals from said first source are impressed on said signal line, whereby a continuous stream of signals is impressed on said line, means for introducing ultra-codal supervisory signals having marking start intervals indicative of the transitions of signaling from said sources of signals, means for enciphering all of said signals prior to transmission from said sending station, and a receiving station including means effective under the control of said ultra-codal supervisory signals for recognizing and deleting said ultra-codal supervisory signals and the signals from said second source.

4. In a secret start-stop telegraph communication system, a signal line, a sending station having a first source of signals and a second source of signals, said signals having normal spacing start intervals means for impressing on said signal line at intermittant intervals signals from said first source, and means for impressing on said signal line signals from said second source at all intervals when no signals from said first source are impressed on said signal line, whereby a continuous succession of signals is impressed on said line, means effective automatically in response to transitions of signaling between said sources of signals for introducing ultra-codal supervisory signals having marking start intervals indicative of said transitions, means for enciphering all of said signals prior to transmission from said sending station, and a receiving station including means for recognizing and deleting said ultra-codal supervisory signals and the signals from said second source.

5. In a secret start-stop telegraph communication system, a signal line, a sending station having a first source of signals and a second source of signals, said signals having normal spacing start intervals means for impressing on said signal line at intermittant intervals signals from said first source, and means for impressing on said signal line signals from said second source intervals when no signals from said first source are impressed on said signal line, whereby a continuous succession of signals is impressed on said line, means effective automatically in response to transitions of signaling between said sources of signals for introducing ultra-codal supervisory signals having marking start intervals indicative of said transitions, means for enciphering all of said signals prior to transmission from said sending station, and a receiving station including means effective under the control of said ultra-codal supervisory signals for recognizing and deleting said ultra-codal supervisory signals and the signals from said second source.

6. In a secret communication system, a signal line, a sending station having a first source of signals and a second source of signals, said signals representing derivable permutations of an equal length start-stop permutation code, means for impressing on said signal line at intermittant intervals signals from said first source, and means for impressing on said signal line signals from said second source at all intervals when no signals from said first source are impressed on said signal line, whereby a continuous stream of signals is impressed on said line, means for introducing an ultra-codal signal having a marking start pulse, a marking stop pulse and all marking codal pulses to indicate the transitions of signaling from said sources of signals, means to encipher all of said signals prior to transmission from said sending station, and a receiving station including means for recognizing and deleting said ultra-codal signals and the signals from said second source.

7. In a secret communication system, a signal line, a sending station having a first source of signals and a second source of signals, said signals representing derivable permutations of a Baudot code, means for impressing on said signal line at intermittant intervals signals from said first source, and means for impressing on said signal line signals from said second source at all intervals when no signals from said first source are impressed on said signal line, whereby a continuous succession of signals is impressed on said line, means for inserting at the transitions of signaling from said sources of signals an ultra-codal signal indicative of said transitions, said ultra-codal signal comprising a marking start pulse, a marking stop pulse and all marking codal pulses, means for enciphering all of said signals prior to transmission from said sending station, and a receiving station including means for recognizing and deleting said ultra-codal signals and the signals from said second source of signals.

8. In a secret communication system, a signal line, a sending station having a first source of signals and a second source of signals, said signals comprising derivable permutations of a Baudot code, means for impressing on said signal line at intermittant intervals signals from said first source, and means for impressing on said signal line signals from said second source at all intervals when no signals from said first source are impressed on said signal line, whereby an continuous succession of signals is impressed on said line, means for inserting at the transitions of signaling from said sources of signals an ultra-codal signal indicative of said transitions, said ultra-codal signal comprising a marking start pulse, a marking stop pulse and all marking codal pulses, means for enciphering all of said signals prior to transmission from said sending station, and a receiving station including means effective under the control of said ultra-codal signal for recognizing and deleting said ultra-codal signals and the signals from said second source.

9. In a secret start-stop telegraph communication system, a signal line, a sending station having a first source of signals and a second source of signals, said signals having normal spacing start intervals means for impressing on said signal line at intermittant intervals signals from said first source, and means for impressing on said signal line signals from said second source at all intervals when no signals from said first source are impressed on said signal line, whereby a continuous succession of signals is impressed on said line, means for inserting supervisory signals at the points of transition said supervisory signals having marking start intervals of transmission from said sources of signals, means for enciphering all of said signals prior to transmission from said sending station, a receiving station including means effective under the control of said ultra-codal supervisory signals for recognizing and deleting said ultra-codal supervisory signals and the signals from one said second source, and means for deciphering the signals from said first source of signals.

10. In a secret start-stop telegraph communication system, a signal line, a sending station having a first source of signals and a second source of signals, said signals having normal spacing start intervals means for impressing on said signal line at intermittant intervals signals from said first source, and means for impressing on said signal line signals from said second source at all intervals when no signals from said first source are impressed on said signal line, whereby a continuous flow of signals is impressed on said line, means for introducing ultra-codal supervisory signals indicative of the transitions of signaling from said sources of signals, said supervisory signals having marking start intervals means for enciphering all of said signals prior to transmission from said sending station, and a receiving station including a receiving distributor and deciphering means for recognizing and deleting said ultra-codal supervisory signals and the signals from said second source, said recognizing means comprising means activated upon the decipherment of said ultra-codal supervisory signals for effectuating said deletion.

11. In a secret start-stop telegraph communication system, a signal line, a sending station having a first source of signals and a second source of signals, said signals having normal spacing start intervals means for impressing on said signal line at intermittant intervals signals from said first source, and means for impressing on said signal line signals from said second source at all intervals when no signals from said first source are impressed on said signal line, whereby a continuous flow of signals is impressed on said line, means for introducing ultra-codal supervisory signals indicative of the transitions of signaling from said sources of signals, said supervisory signals having marking start intervals means for enciphering all of said signals prior to transmission from said sending station, and a receiving station including a continuously rotating distributor and deciphering means for recognizing and deleting said ultra-codal supervisory signals and the signals from said second source, said recognizing means comprising a relay means controlled by said deciphering means for effectuating said deletion.

12. In a system of secret telegraph communication, an incoming channel over which bursts of live traffic are periodically received, an outgoing channel susceptible of operating at a higher speed than said incoming channel, a cipher unit interconnecting said channels, said unit comprising a signal storage device having a plurality of storage loops wherein a positive loop condition is indicative of the presence of stored signals and a negative loop condition is indicative of the absence of stored signals, means governed by a negative loop condition in said storage device for generating special supervisory signals for compensating for the speed difference between said channels, means for inserting masking signals during pauses between said periodically received live traffic, means for inserting said supervisory signals upon transitions from said received live traffic to said masking signals and vice versa, means for enciphering all of said signals and traffic, and means operable automatically upon encipherment of all said signals and traffic for transmitting the enciphered signals over said outgoing channel.

* * * * *